(No Model.)
W. A. WRIGHT.
SCALE.
No. 451,677. Patented May 5, 1891.
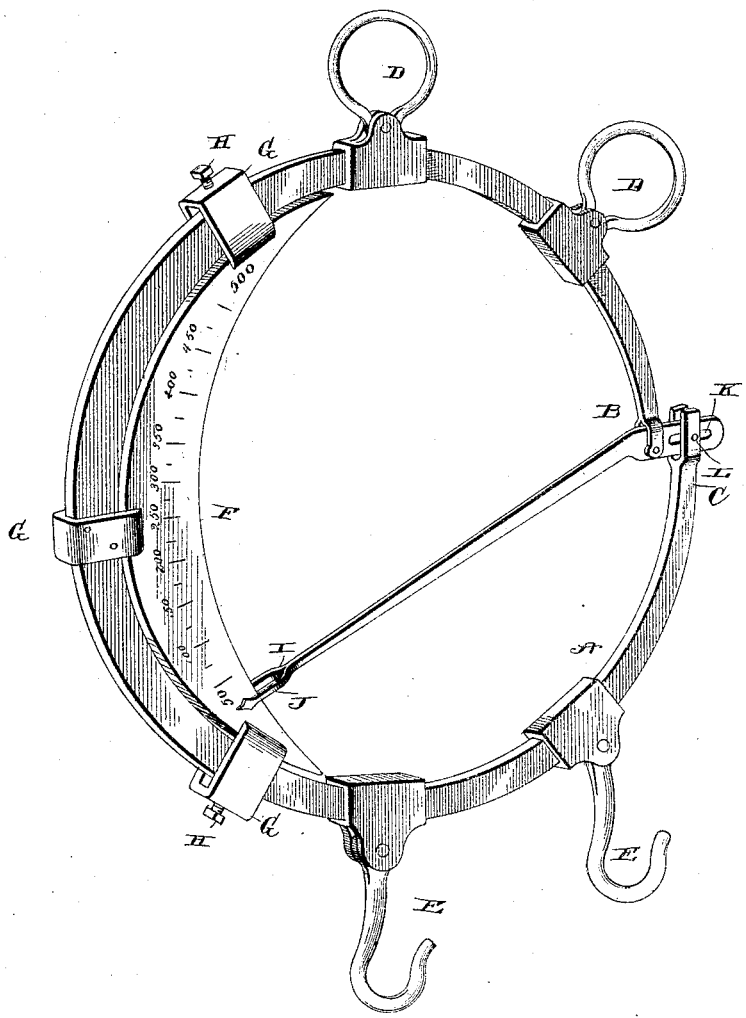
Witnesses  Inventor
John Inuve  William A Wright
R. H. Bishop  By his Attorney
  W. W. Calmore

UNITED STATES PATENT OFFICE.

WILLIAM A. WRIGHT, OF PHILADELPHIA, PENNSYLVANIA, ASSIGNOR OF ONE-HALF TO JOHN W. WALSH, OF SAME PLACE.

SCALE.

SPECIFICATION forming part of Letters Patent No. 451,677, dated May 5, 1891.

Application filed November 21, 1890. Serial No. 372,244. (No model.)

*To all whom it may concern:*

Be it known that I, WILLIAM A. WRIGHT, a citizen of the United States, residing at Philadelphia, in the county of Philadelphia and State of Pennsylvania, have invented certain new and useful Improvements in Scales, of which the following is a specification, reference being had therein to the accompanying drawing.

My invention relates to improvements in scales, and has especial reference to scales for weighing ice, the object being to produce a device of simple construction which will be alike applicable to light and heavy weights.

The invention consists in certain novel features, which will be hereinafter more fully disclosed in the specification, drawing, and claim.

In the drawing I have shown a perspective view of my improved scale.

In carrying out my invention I employ a frame or base A, consisting of a stout band formed of some resilient material and having its ends B C tapered and brought close together, as clearly shown. The frame is provided on its upper portion or arm with the rings D D, to which I secure chains or equivalent devices to suspend the scale in its operative position, or the said rings may be engaged over hooks on a fixed support. On the lower portion or arm of the frame or base I secure the hooks E for the purpose of suspending the object to be weighed on the scales.

The dial, indicator, or measure consists of an arc-shaped block F secured to and against the inner edge of the base or band A at the center of the same, and having a series of graduations on its sides, the graduations on one side being numbered consecutively from 0 to 50, and those on the other side being numbered from 50 to 500. This arc-shaped block is secured to the band A by means of the loops G at its ends, which encircle the band, and the set-screws H, which are mounted in the said loops and bear against the band. This arrangement provides for adjusting or truing the device after long continued use, as, should the ends of the band become separated under the repeated strains placed thereon, it is necessary only to turn the set-screws home, and thereby press the ends of the band together.

The pointer or index I consists of a lever tapered toward one end, said end J being bifurcated or forked and having its arms playing in front of the dial-faces. The opposite end of the pointer is provided with a longitudinal slot K, as clearly shown. The pointer is pivoted to the upper end of the band or frame near the said slotted end, and the lower end of the band is provided with a lateral stud or pin, which engages the said slot; the ends of the band being thus connected.

From the foregoing description, taken in connection with the accompanying drawings, it will be seen that I have provided a scale which is very simple in its construction, and the operation of the same will, it is thought, be readily understood. When it is desired to use the device, the article to be weighed is suspended from one of the hooks and left free. The lower end of the band is thus caused to descend under the strain put thereon, and the pointer consequently caused to swing in front of the dial until the increased tension of the band (caused by separating its ends, and thereby straightening it) is sufficient to support the article. The number in front of which the end of the pointer comes to rest will be the weight of the suspended article. The weight of the article will be thus accurately and rapidly ascertained.

Should the dial or any other part of the device become worn out or broken, it can be easily removed and a new one substituted, as the device is free of all complicated arrangements or combinations, and as it is composed of very few parts it can be manufactured at a comparatively trifling cost.

Having thus described my invention, what I claim, and desire to secure by Letters Patent, is—

A scale consisting of a spring-band, a dial, loops secured to said dial and encircling the band, set-screws mounted in the loops and bearing against the band, and a pointer pivoted to one end of the band and having a pin-and-slot connection with the other end thereof, as set forth.

In testimony whereof I affix my signature in the presence of two witnesses.

WILLIAM A. WRIGHT.

Witnesses:
JOHN F. HALBACH,
WALTER W. CALMORE.